United States Patent [19]

Treude

[11] Patent Number: 5,660,250
[45] Date of Patent: Aug. 26, 1997

[54] PARTIALLY LINED DISC BRAKE FOR INSTALLATION IN HEAVY-DUTY DRIVES OF INDUSTRIAL PLANTS, ROPEWAY DRIVES, AND CRANES

[75] Inventor: Hans Walter Treude, Wilnsdorf, Germany

[73] Assignee: Bubenzer Bremsen Gerhard Bubenzer Ing. GmbH, Freudenberg, Germany

[21] Appl. No.: 631,984

[22] Filed: Apr. 15, 1996

Related U.S. Application Data

[63] Continuation of Ser. No. 582,346, Jan. 19, 1996, abandoned, which is a continuation-in-part of Ser. No. 107,072, Aug. 17, 1993, abandoned.

[30] Foreign Application Priority Data

Feb. 20, 1993 [DE] Germany .................. 43 05 285.1

[51] Int. Cl.⁶ .................................................. F16D 55/08
[52] U.S. Cl. .................................................. 188/72.9
[58] Field of Search .................. 188/28, 46, 56, 188/58, 59, 71.1, 73.3, 72.9, 171

[56] References Cited

PUBLICATIONS

Prospectus "Scheibenbremse SB 14" by Gerhard Bubenzer Ing. GmbH published 1992.

*Primary Examiner*—Robert J. Oberleitner
*Assistant Examiner*—L. T. Bartz
*Attorney, Agent, or Firm*—Young & Thompson

[57] ABSTRACT

A partially lined disc brake of a compact and simple design with a brake capacity variable over a wide range and characterized by braking reliability of a high order is suitable for use both with a single brake caliper and with a double brake caliper. The partially lined disc brake is characterized by virtue of the use of a single release unit only, offset outwards in the brake disc plane, by a simple, trouble free drive for closing and opening the brake calipers, and a reliable brake-lining wear-compensation device.

2 Claims, 5 Drawing Sheets

PARTIALLY LINED DISC BRAKE FOR INSTALLATION IN HEAVY-DUTY DRIVES OF INDUSTRIAL PLANTS, ROPEWAY DRIVES, AND CRANES

CROSS-REFERENCE TO RELATED APPLICATION

This application is a continuation of my application Ser. No. 08/582,346 filed Jan. 19, 1996, which is a continuation-in-part of application Ser. No. 08/107,072 filed Aug. 17, 1993 and both now abandoned.

FIELD OF THE INVENTION

The invention concerns a partially lined disc brake for installation in heavy-duty drives of industrial plants, ropeway drives, cranes and suchlike.

BACKGROUND OF THE INVENTION

Such disc brakes contain two levers of a brake caliper pivotally mounted at their lower end and two likewise pivotally mounted and opposing lining carriers with replaceable friction linings which are caused to be forced against a brake disc arranged on a driving or driven shaft during the braking operation. With these disc brakes, the pivotal plane of the opposing levers is parallel to the axis of rotation of the brake disc. A brake force generator in the form of an adjustable brake spring effects the closing of the brake during a braking operation via a lever linkage coupled to the free end of the brake caliper lever, the lever linkage being automatically compensated for wear at the friction lining. A releasing unit coupled to the same lever linkage generates the necessary force for overcoming the brake spring and thus for releasing the brake.

In comparison with drum brakes which are mainly used in the iron and steel industry in particular, disc brakes have substantial advantages.

Through the use of highly developed friction lining materials in conjunction with the shape of the lining and the favourable wear behaviour achieved by this, disc brakes have a very much longer service life than drum brakes. Another advantage of disc brakes is that the braking torque can be varied by the brake diameter without changing the brake mechanism whereas with drum brakes a brake drum of the appropriate diameter must be chosen to change the braking torque whereby a brake mechanism matched to the drum diameter is required at the same time.

By virtue of the indisputable advantage of disc brakes, drum brakes are being increasingly replaced by disc brakes in industrial installations of all kinds.

In the replacement of a drum brake by a disc brake in existing installations, one problem which exists is that on account of the limited space available between the drive motor and the gearing the overall dimensions of the disc brake in the direction of the axis of rotation of the brake disc may not be appreciably greater than the width of the brake drum of the drum brake originally fitted. With older crane installations, a further complication is that due to the incorporation of the release unit in the drive motor circuit a bulky electromagnetic release unit with a dc drive must be used.

With the generic disc brake as specified in U.S. Pat. No. 3,968,864 which is characterized by a compact design, disc springs are used as brake force generators whereby the two brake levers of the brake caliper are each driven by a disc spring assembly. However, experience has shown that disc springs are a risk factor for brakes with a high on/off frequency due to their limited service life. Furthermore, by virtue of their steep spring characteristic, they have a limited adjustment capability. But this adjustment capability of the brake springs is a desirable feature for taking account of the different application situations of the brake. Finally, due to its complicated mechanism, the known disc brake has a high fault liability and in the form described cannot be operated with the electromagnetic dc release unit usual in US drum brakes.

SUMMARY OF THE INVENTION

The invention is based on the object of developing a partially lined disc brake of the generic type of a compact and simple design with a brake capacity variable over a wide range and characterized by braking reliability of a high order which provides for the installation of the electromagnetic dc release usual in US drum brakes, it being suitable for use both with a single brake caliper and with a soluble brake caliper whereby the latter is actuated by one release unit only.

In accordance with the invention, this object is solved by a partially lined disc brake with the characteristics of claim 1.

The sub-claims list additional expedient forms of the invention.

The partially lined disc brake in accordance with the invention is characterized especially in the version with two brake calipers, by virtue of the use of a single release unit only, offset outwards in the brake disc plane, by a compact design, a simple, troublefree drive for closing and opening the brake calipers and a reliable brake-lining wear-compensation device. In existing industrial installations and the like using drum brakes, the latter may be easily replaced by the new partially lined disc brake.

BRIEF DESCRIPTION OF THE DRAWINGS

The invention is explained below by two versions of a partially lined disc brake as shown in the diagram. The following diagrams are shown.

DETAILED DESCRIPTION OF THE INVENTION

Figure 1:
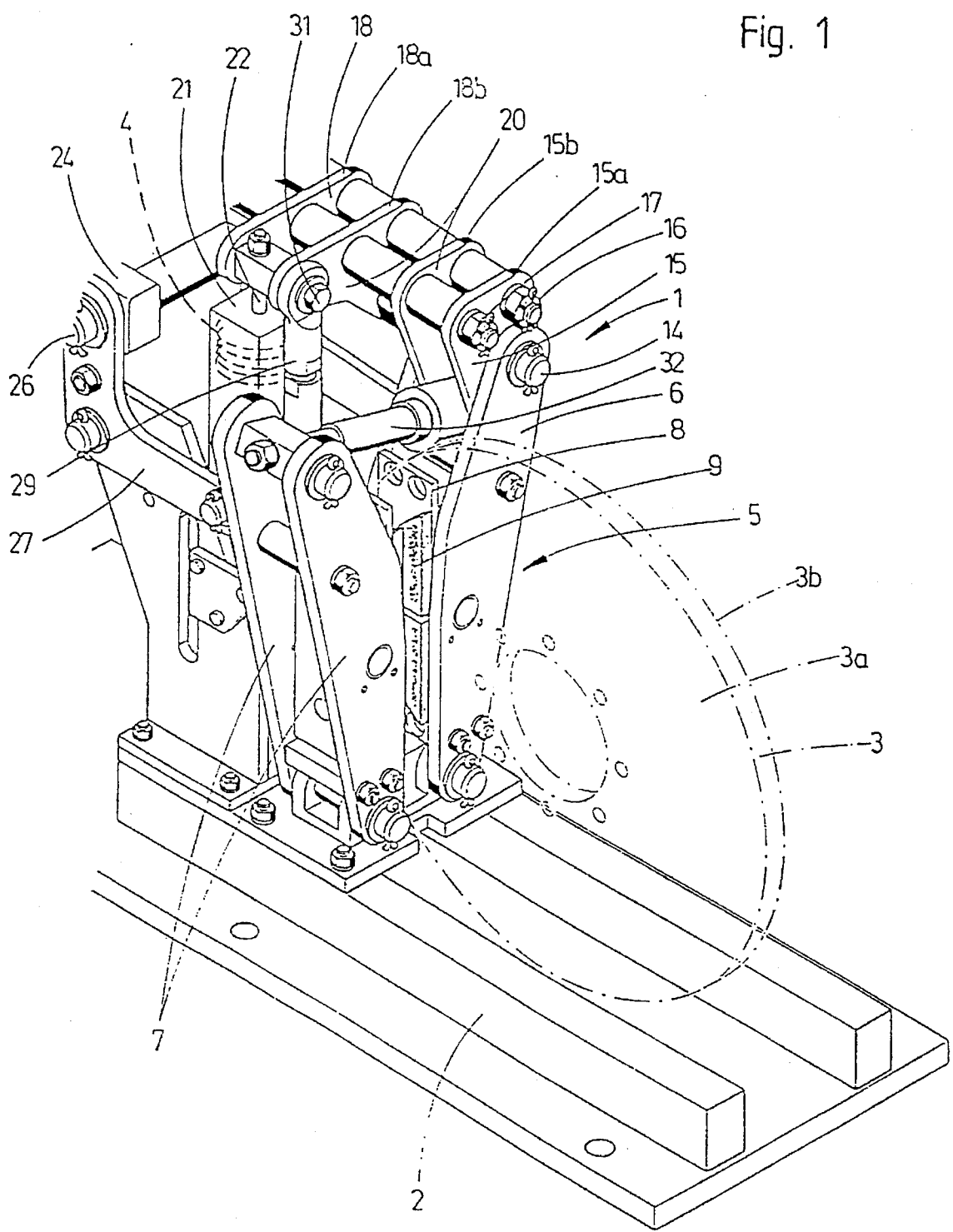
FIG. 1 a perspective view of the basic form of the new partially lined disc brake with electromagnetic dc release unit FIG. 2 a view turned through 90° of the same form of the disc brake to show the arrangement of the friction linings FIG. 3 a frontal view of the disc brake as in FIGS. 1 and 2 in a schematic representation FIG. 4 a section through the line IV—IV of FIG. 3 and FIG. 5 the schematic frontal view of a version of the partially lined disc brake with two pairs of brake levers, two brake force generators and an electromagnetic dc release unit.
Figure 2:
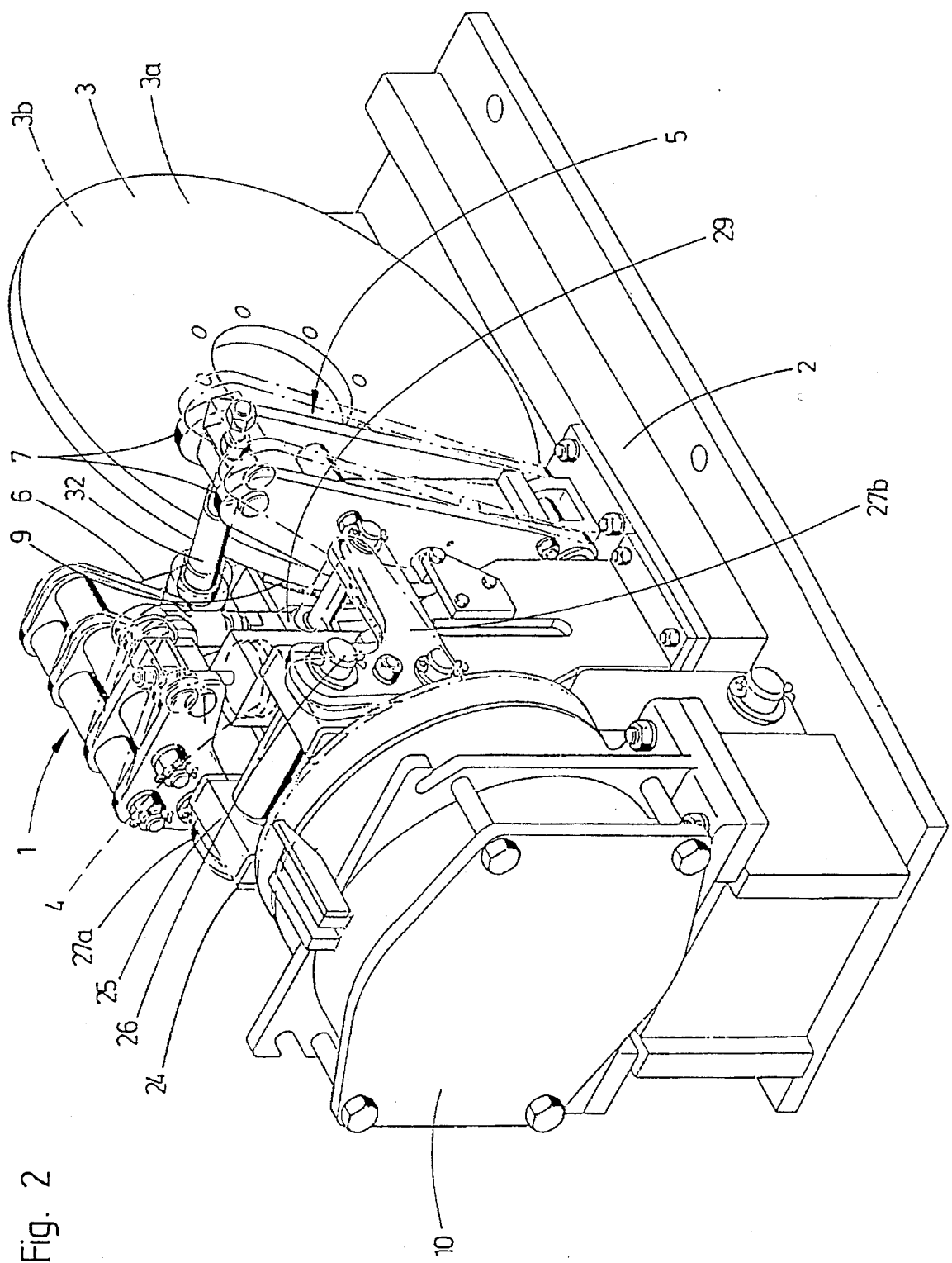
Figure 3:
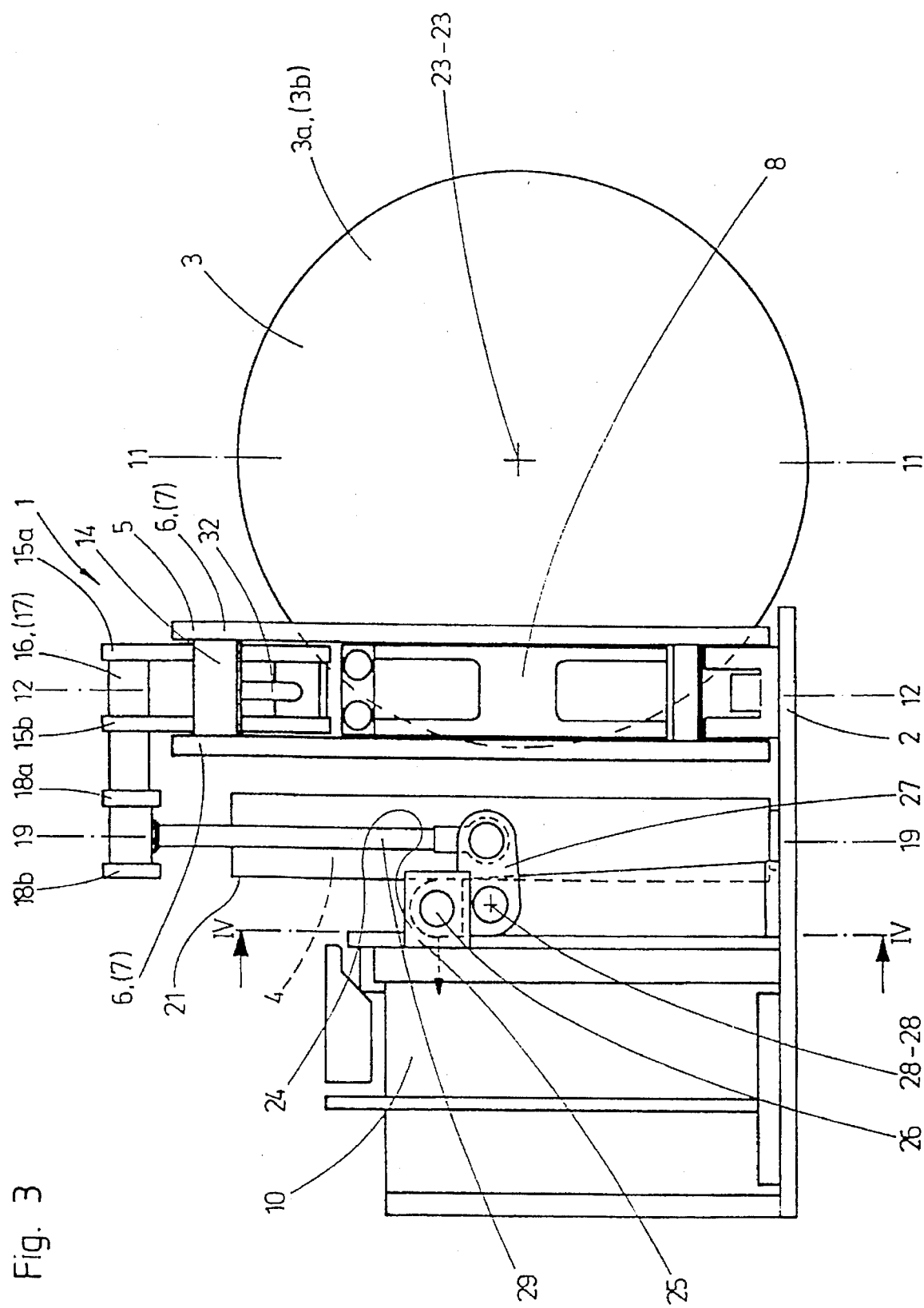

The partially lined disc brake 1 mounted on a base plate 2 as shown in FIGS. 1 to 4 for installation in heavy-duty drives of industrial installations, ropeway drives, cranes and the like features as its principal components a brake disc 3 arranged on a driving or driven shaft, an adjustable brake spring 4 for closing a brake caliper 5 via a lever system during the braking operation, the two double levers of which 6 and 7 act with friction linings 9, fixed to replaceable carriers 8, on the peripheral area of the two brake disc surfaces 3a and 3b and an electromagnetic dc release unit 10 assigned to the adjustable brake spring 4.

The brake levers 6 and 7 as double levers are arranged at the base plate 2 in such a manner that they can be swung in a middle plane 12—12 which is offset towards the outside and is parallel to the vertical plane of the rotational axis 11—11 and together represent a brake caliper 5.

The upper end of the brake lever 6 arranged as a double lever serves as a bearing for a pintle 14 arranged parallel to the plane of the brake disc 13—13, the pintle being firmly connected to a control lever 15 which protrudes above and below the pintle 14. The control lever 15 is arranged as a double lever with two parallel and congruent single levers 15a and 15b which are connected to each other by the pintle 14 and two other bolts 16 and 17. The upper end of the control lever 15 is connected via the extended bolts 16 and 17 to another control lever 18 which is horizontally arranged in a plane 19—19 which is offset towards the outside and is parallel to the middle pivoting plane 12—12 of the pair of brake levers 6 and 7. The control lever 18 is likewise formed as a double lever with two parallel and congruent single levers 18a and 18b which are connected to each other by the bolts 16 and 17. The two control levers 15 and 18 form a rectangular lever 20.

The adjustable brake spring 4, which is mounted in a housing 21 fixed to the base plate 2, acts on a tie rod 22 which is coupled to a hinge bolt 31 at the free end of the control lever 18, which is bent outwards, of the rectangular lever 20.

The electromagnetic dc release unit 10 is mounted on the base plate 2 in an outwardly offset manner in relation to the pivotal axis 23—23 of the brake disc 3 and features a retractable fork 24 which is moved horizontally by the electromagnetic drive of the release unit 10 in the plane of the brake disc 13—13. The retractable fork 24 of the release unit 10 is connected by a hinge bolt 26 in an articulated manner to the upper ends of the single levers 27a and 27b which together form a double rectangular lever 27 which can be moved around an axis 28—28 parallel to the middle pivoting plane 12—12 of the brake levers 6 and 7. The double rectangular lever 27 is coupled at its other end to the lower end of a plunger rod 29 which is coupled by its upper end to the hinge bolt 31 of the angled lever 18 of the rectangular lever 20 for the actuation of the brake caliper 5 and is movable in the pivoting plane 19—19 of the lever 18 in the vertical direction.

A tie rod 32 with an integrated, automatic brake-lining wear compensation device is coupled to the lower end of the lever 15 acting directly on one brake lever 6 of the brake caliper 5 and to the free end of the other brake lever 7.

Figure 5:
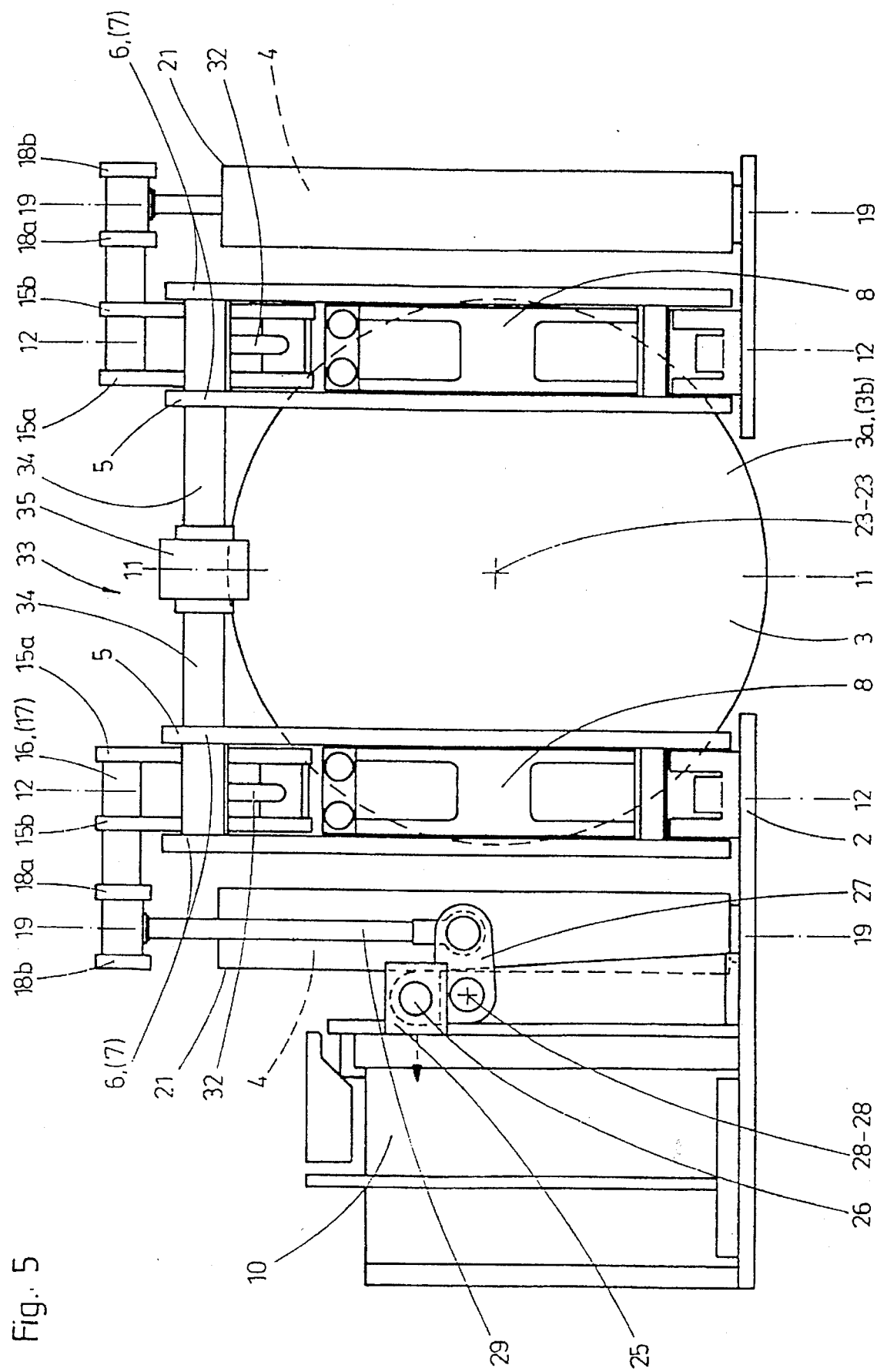

With the second version of a preferred partially lined disc brake 33 shown in FIG. 5, this is equipped with two identical brake calipers 5 which act on the brake disc 3 in a diametrically opposed manner and with an electromagnetic dc release unit 10 for opening the two brake calipers 5.

For the release of the two brake calipers 5 with this disc brake version, instead of a pintle a rotatable part-shaft 34 is inserted in the free end of one brake lever 6 of the two brake calipers 5 whereby the two part-shafts 34 bridging the brake disc 3 are connected to each other by a compensating coupling 35 which in turn compensates an offset of the part-shafts 34 due to a difference in wear of the linings of the two brake calipers 5.

Figure 4:
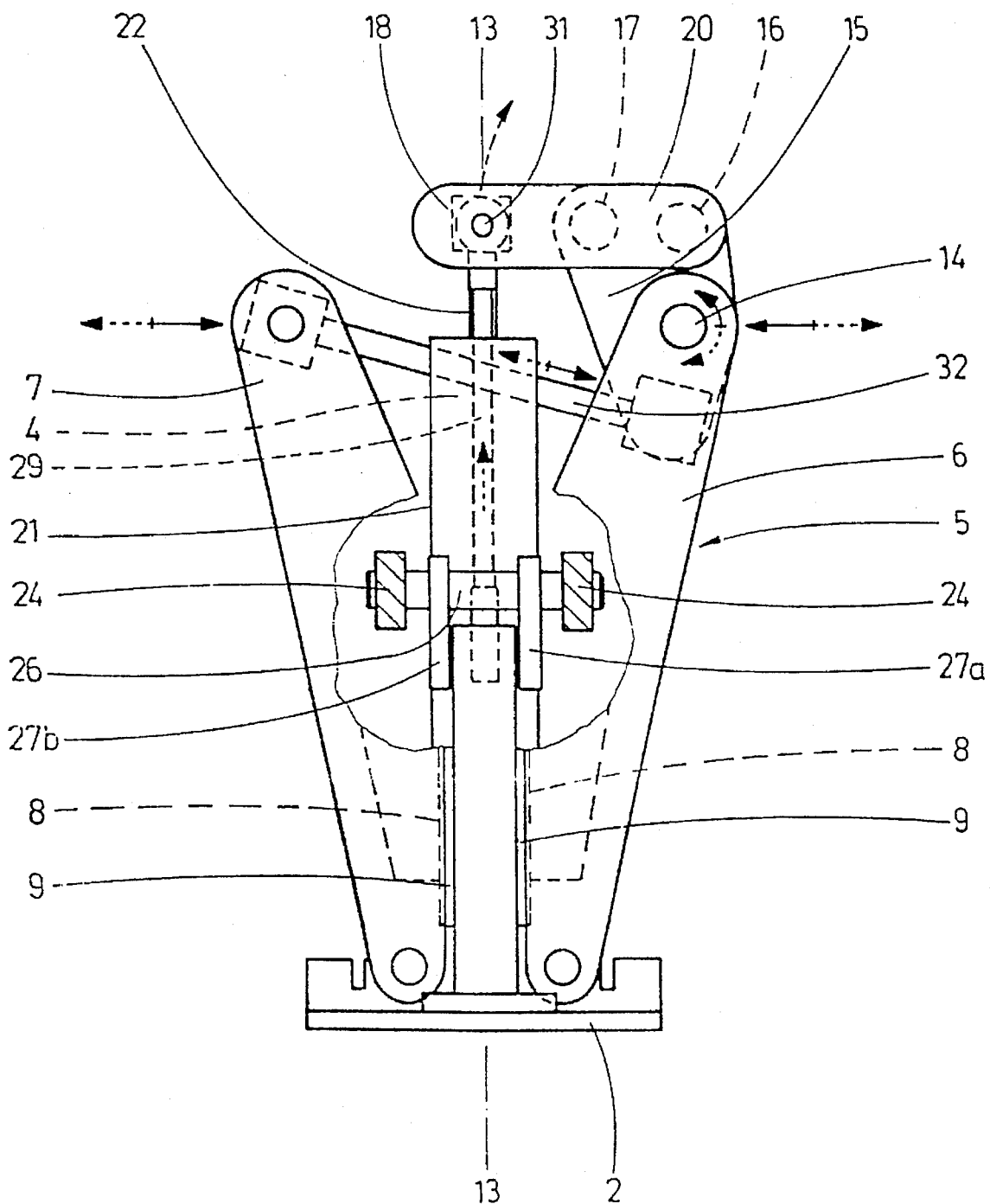

The kinetics of the actuator of the partially lined disc brakes 1 and 33 during the braking operation and when the brakes are released are indicated in FIG. 4 by the movement arrows assigned to the individual control elements whereby the continuous arrows mark the braking operation and the broken arrows the release of the brakes.

I claim:

1. Partially lined disc brake for installation in heavy-duty drives of industrial plants, ropeway drives and cranes, comprising:

a brake disc arranged on a driving or driven shaft;

at least one adjustable brake force generator in the form of a brake spring for closing a brake caliper during a braking operation, said brake caliper having two brake levers with friction linings fixed to interchangeable carriers in an outwardly offset pivoting plane parallel to an axis perpendicular to the rotational axis of the brake disc, and which act on the peripheral area of the two disc surfaces of the brake disc;

a release unit for opening the brake caliper which acts via a lever system on the brake levers, said brake caliper comprising a pintle arranged parallel to the plane of the brake disc and carried in the upper part of one of the brake levers;

a first control lever firmly arranged on the pintle and protruding upwards and downwards beyond the pintle and also between a pivoting plane of the brake levers, said first control lever being formed as an articulated lever, one end of the first control lever being connected by bolts to a second control lever which is arranged horizontally in an outwardly offset plane parallel to the pivoting plane of the brake levers, whereby the first and second control levers form a rectangular lever, said brake spring acting on a first tie rod which is coupled to the other free end of the second control lever;

an electromagnetic DC-driven release unit mounted in the plane of the brake disc in an outwardly offset manner in relation to the rotational axis of the brake disc with a retractable fork which is coupled in a movable manner to an operating lever in the plane of the brake disc or in a plane parallel to the brake disc, said operating lever being coupled to the lower end of a plunger rod and pivoting around an axis parallel to the pivoting plane of the pair of brake levers, the upper end of the plunger rod being coupled to the second control lever of the rectangular lever for the actuation of the brake caliper and being vertically movable in the plane parallel to the pivoting plane of the pair of brake levers; and a second tie rod with an integrated, automatic brake-lining wear compensation device which is coupled to the lower end of the first control lever acting directly on one brake lever of the brake caliper and to one of the free ends of the other brake lever.

2. Disc brake according to claim 1, characterized as being equipped with two identical brake calipers which act on the brake disc in a diametrically opposed manner and wherein the release unit is adapted to open the two brake calipers, and for the release of the two brake calipers, said disc brake being equipped with a rotatable part-shaft which is inserted in one end of the brake lever of each of the two brake calipers, whereby the two part-shafts bridging the brake disc are connected to each other by a compensating coupling.

* * * * *